Jan. 26, 1971 G. H. BEALL 3,557,575
PROCESS FOR FORMING A BASALTIC GLASS-CERAMIC PRODUCT
Filed Feb. 4, 1969

INVENTORS.
George H. Beall
Hermann L. Rittler
BY
ATTORNEY

United States Patent Office 3,557,575
Patented Jan. 26, 1971

3,557,575
PROCESS FOR FORMING A BASALTIC
GLASS-CERAMIC PRODUCT
George H. Beall, Corning, and Hermann L. Rittler,
Horseheads, N.Y., assignors to Corning Glass Works,
Corning, N.Y., a corporation of New York
Continuation-in-part of application Ser. No. 589,222,
Oct. 25, 1966. This application Feb. 4, 1969, Ser.
No. 796,522
Int. Cl. C03b 3/22
U.S. Cl. 65—33                                10 Claims

ABSTRACT OF THE DISCLOSURE

This invention relates to the manufacture of glass-ceramic articles, wherein magnetite crystals alone or in combination with clinopyroxene crystals constitute substantially all of the crystals present, by melting naturally-occurring basalts under oxidizing conditions, cooling the molten basalt to a glass, and then heat treating the glass under non-reducing conditions to crystallize in situ uniformly fine-grained crystals of magnetite with or without clinopyroxene homogeneously dispersed in a glassy matrix.

---

Figure 1:
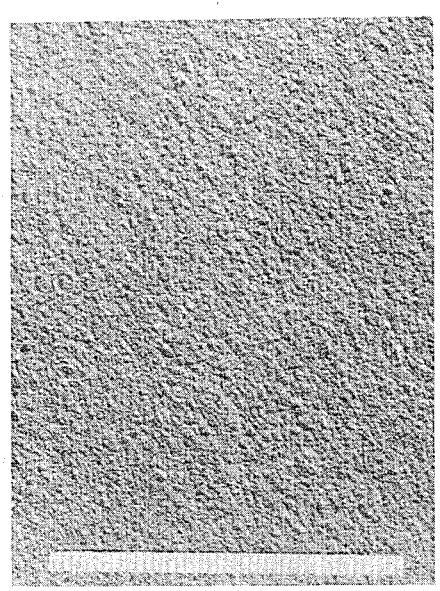

This application is a continuation-in-part of our pending application, Ser. No. 589,222, filed Oct. 25, 1966 and now abandoned.

Basalt is a dark-gray to black, dense, fine-grained, igneous rock which is the major constituent of oceanic islands and a common component of the continental land masses as well. In the United States, basalt is observed along the Connecticut River Valley of Massachusetts and Connecticut and along the Hudson River Valley of New York and New Jersey. It is widespread throughout the Rocky Mountain region, the Pacific Northwest, and composes almost all of the Hawaiian Islands.

Basalt has been classified in mineralogy as a basic, i.e., rich in CaO, MgO, and FeO, volcanic rock wherein the essential constituents are the minerals feldspar, pyroxene, and magnetite. The feldspar is normally calcic plagioclase and the pyroxene usually augite. Olivine and hypersthene are often present but are not essential ingredients. In general, the feldspar and pyroxene components constitute the major portion of the rock with magnetite and olivine being present in minor amounts. A greater or lesser amount of basalt glass (a black glassy form of basalt) may sometimes be included.

Basalt is hard, strong, and chemically resistant, particularly to alkalies. In the United States, it has been used as a constituent in concrete, road beds, and filter systems. Many attempts have been undertaken to melt and form useful articles from basalt in order to utilize its interesting physical and chemical properties both in this country and abroad. In France during the early 1900's, fused basalt was formed into road paving blocks, chemically resistant castings, and electrical insulators. Electrical insulators from fused basalt were made in this country during the 1920's and 1930's. Today, in Czechoslovakia and Russia, a petrurgical industry based upon fused basalt has developed, the principal products of which are abrasion and chemically resistant fixtures useful in the construction industry.

The method for manufacturing these products utilized, in general, the following procedure. Raw basalt was melted and the melt poured into molds. The melt was then allowed to cool slowly such that it would crystallize into a relatively coarse-grained body. These articles exhibited the same basic mineral and crystal structures as the original rock.

The discovery of the production of glass-ceramics by Dr. S. D. Stookey (Pat. No. 2,920,971) opened an entire new field in the ceramic art. A glass-ceramic body is composed of a myriad of fine-grained crystals of relatively uniform size randomly oriented and homogeneously dispersed in a glassy matrix, the crystals comprising the major portion of the body. Such products are made through the controlled crystallization of glass bodies. As is explained in the above-cited patent, a glass-forming batch, to which is generally added a crystallization catalyst or nucleating agent, is melted and then the melt is simultaneously cooled to a glass and an article of the desired configuration shaped therefrom. This glass shape is thereafter heat treated in such a manner that nuclei are first formed which act as sites for the growth of crystals thereon as the heat treatment is continued. Since the crystallization begins at these innumerable points supplied by the nuclei throughout the body, the resulting crystallization is, perforce, numerous, uniformly dispersed in the body, and fine-grained. Since glass-ceramic articles are very highly crystalline, over 50% by weight and frequently over 75% by weight, the physical and chemical properties thereof generally approximate those of the crystal phases present rather than the original glass. The crystal phases developed are dependent upon the composition of the original glass and the heat treatment applied thereto. Thus, it is often possible to cause the crystallization of one particular phase at a low temperature and a different or additional phase at higher temperatures. And, because the crystallization occurs in situ, glass-ceramic bodies are free of voids and non-porous.

Since basalt possesses such interesting physical and chemical properties, particularly its abrasion and chemical resistance, the principal object of this invention is to produce a glass-ceramic article made from basalt.

Another object of this invention is to provide a method for making glass-ceramic articles from basalt.

Two prior attempts to obtain a crystallized basalt body by heat treating objects cast from a molten mass are reflected in Pats. Nos. 1,108,007 and 1,893,382. The earlier patent (issued Aug. 18, 1914) outlines in general terms a method whereby basalt was melted, the melt cast into molds, and the cast articles, before the temperature thereof fell below 500° C., introduced into a furnace operating at about 800° C., maintained thereat for about ½–1½ hours, and then cooled gradually to room temperature. No description of the melting environment or of the structure of the final product is supplied.

Pat. No. 1,893,382 describes two methods for making cast basalt articles. The primary method disclosed therein contemplates melting basalt under reducing conditions, the melt is cast into molds, and the castings while still very hot are introduced into a furnace operating at 725° C. The castings are held at that temperature for about one hour and then reheated to 900° C. where they are also maintained for about an hour. The second method described, which the patentee states does not yield as satisfactory a product as the first method, entails melting basalt under oxidizing conditions, the melt cast into suitable shapes, and the castings immediately loaded into a furnace operating at 900° C. The castings are maintained at this temperature for about one hour. Thus, both of these methods involve the crystallization of supercooled basalt without going through a cold glass stage.

The patentee describes the structure of the casting produced by practicing his first method as indicating recrystallization of the melt beginning from the outside and proceeding to the center thereof with a thin surface layer of vitreous material. This type of crystal growth is well known in the glass art and is often referred to as "normal devitrification." Such growth does not result in uniformly fine-grained crystallization. The structure of the material obtained by following the second method is stated to be crystal growth starting from the center of the casting and extending to the outside with a rather thick surface skin of vitreous material. Here, again, the crystals cannot be uniformly fine-grained and homogeneously dispersed throughout the body since their growth begins in one area and radiates outwardly therefrom.

We have discovered that a product containing very fined-grained, uniformly-sized crystals can be crystallized in situ from a synthetic basalt glass, wherein the crystals may comprise the predominant portion of the product and are homogeneously dispersed in a glassy matrix through the careful adjustment of melting conditions and heat treatment parameters. The resulting product is stronger, harder, and more resistant to chemical attack than naturally-occurring basalt or any fusion cast basalt material. These properties, coupled with low cost of production, make this material suitable for roofing shingles, building cladding, abrasion-resistant piping, chemical stoneware, and floor tiles.

In its broadest terms, our invention comprises melting raw basalt rock in crucibles, pots, or continuous glass-melting tanks, depending upon the amount of product desired, under oxidizing conditions. The melt is simultaneously cooled to a glass and a shape of a desired configuration formed therefrom employing any of the conventional glass forming techniques such as casting, drawing, pressing, rolling, spinning, etc. The glass shape is then subjected to a rather rigidly controlled heat treating schedule which first permits the development of many nuclei which provide sites for the subsequent growth of crystals thereon. Thus, in the general practice of our invention, this heat treatment normally involves first heating the glass body to a temperature between the transformation range of the glass and the softening point thereof for a sufficient time to cause the development of nuclei (the nucleation range) and then raising the temperature to above the softening point of the glass to expedite the growth of crystals on the nuclei (the crystallization range).

There is considerable variation in composition between various types of basalt since about all that is required of a basalt from a chemical analysis standpoint is that the major constituents be $SiO_2$, $Al_2O_3$, MgO, CaO, iron oxides and of a lesser import $Na_2O$ and $K_2O$. Hence, Table I reports typical basalt compositions in weight percent from the three major types, viz., tholeiites, olivine tholeiites, and alkali basalts.

TABLE I

|  | Tholeiites | | Olivine tholeiites | | Alkali basalts | |
| --- | --- | --- | --- | --- | --- | --- |
|  | Deccan Trap, India | Karroo Trap, South Africa | Kilaueu, Hawaii | Tahiti | New Zealand | Saint Helena |
| $SiO_2$ | 50.61 | 52.25 | 49.43 | 44.26 | 46.5 | 47.62 |
| $TiO_2$ | 1.91 | 1.10 | 2.85 | 3.46 | 2.5 | 3.57 |
| $Al_2O_3$ | 13.58 | 14.60 | 12.92 | 14.30 | 15.9 | 16.27 |
| $Fe_2O_3$ | 3.19 | 0.84 | 3.14 | 4.61 | 2.9 | 3.87 |
| FeO | 9.92 | 9.89 | 8.34 | 7.79 | 7.2 | 8.17 |
| MnO | 0.16 | 0.45 | 0.18 | 0.21 | 0.3 | 0.11 |
| MgO | 5.46 | 6.95 | 9.24 | 8.34 | 5.2 | 6.33 |
| CaO | 9.45 | 9.71 | 11.02 | 11.26 | 12.6 | 8.65 |
| $Na_2O$ | 2.60 | 2.21 | 2.22 | 3.48 | 4.1 | 3.82 |
| $K_2O$ | 0.72 | 0.96 | 0.52 | 1.59 | 2.5 | 1.14 |
| $P_2O_5$ | 0.39 | 0.22 | 0.26 | 0.70 | 0.3 | 0.45 |
| $H_2O$ | 2.13 | 1.03 | 0.18 | | | |

However, within one particular class of basalts, the composition variation, even across the continents, is not great. For example, the two tholeiites listed in Table I compare favorably with the analyses of five tholeiitic basalts taken from various parts of the United States as recorded in Table II.

TABLE II

|  | Tholeiites | | | | |
| --- | --- | --- | --- | --- | --- |
|  | Albuquerque, N.M. | Somerset Co., N.J. | Holyoke, Mass. | Westfield, Mass. | Mt. Tom, Mass. |
| $SiO_2$ | 53.0 | 51.5 | 52.5 | 52.0 | 53.5 |
| $TiO_2$ | 0.9 | 1.3 | 1.1 | 1.0 | 1.0 |
| $Al_2O_3$ | 14.2 | 14.3 | 14.5 | 14.1 | 14.4 |
| MgO | 6.3 | 7.9 | 5.3 | 6.4 | 5.2 |
| CaO | 9.0 | 10.0 | 9.8 | 9.3 | 9.5 |
| $Na_2O$ | 2.5 | 4.7 | 2.6 | 3.2 | 2.5 |
| $K_2O$ | 0.7 | 0.5 | 0.6 | 1.2 | 0.7 |
| Total Fe as $Fe_2O_3$ | 13.4 | 10.4 | 13.3 | 12.8 | 12.7 |

For any manufacturing process based upon the melting of basalt, tholeiitic basalts have several distinct advantages. First, tholeiitic flows are very extensive and their composition remarkably uniform. Second, tholeiitic basalts have the lowest liquidus temperatures of the most common basalt types, a very important factor to be considered in glassmaking. And, third, regardless of whether the basalt melts are crystallized upon slow cooling or upon reheating of basaltic glass, the major crystal phases are clinopyroxene and magnetite. Among the low-liquidus basalts, the tholeiitic basalts are richest in these constituents and, therefore, have the highest crystallinity in the final product. For these reasons, then, tholeiitic basalts are preferred for the practice of this invention although very satisfactory products can be made from the other basalts.

In demonstrating the normal practice of this invention in more specific terms, samples of the seven basalts whose analyses are set out in Table III were crushed, placed in open platinum crucibles, and then heated at temperatures ranging between 1350°–1600° C. for a sufficient length of time to insure a homogeneous melt, usually about ½–6 hours. Example 2 is a trachybasalt, Example 3 is an alkali basalt, and the rest are tholeiites. At temperatures above 1600° C., in equilibrium with air, almost all of the iron in the basalt is present in the divalent or reduced state whereas at lower temperatures at least part of the iron is present in an oxidized state under air-equilibrium conditions. Melting experiments have demonstrated that the most oxidizing conditions are reached through long melting times at low temperatures whereas the most reduced conditions are developed with relatively short melting periods at higher temperatures. Thus, higher melting temperatures can be utilized, but stirring, bubbling air through the melt, or some other means of air equilibration would be required prior to forming the melt into glass shapes.

TABLE III

|  | 1 | 2 | 3 | 4 | 5 | 6 | 7 |
| --- | --- | --- | --- | --- | --- | --- | --- |
| $SiO_2$ | 52.0 | 48.6 | 46.3 | 49.6 | 51.5 | 52.5 | 53.0 |
| $Al_2O_3$ | 14.1 | 15.2 | 13.3 | 13.2 | 14.3 | 14.5 | 14.2 |
| CaO | 9.3 | 9.1 | 10.6 | 10.7 | 10.0 | 9.8 | 9.0 |
| MgO | 6.4 | 5.2 | 9.0 | 8.3 | 7.9 | 5.3 | 6.3 |
| $TiO_2$ | 1.0 | 1.1 | 2.4 | 3.2 | 1.3 | 1.1 | 2.9 |
| $Na_2O$ | 3.2 | 3.9 | 4.0 | 2.3 | 4.7 | 2.6 | 2.5 |
| $K_2O$ | 1.2 | 4.7 | 2.2 | 0.6 | 0.5 | 0.6 | 0.7 |
| Total Fe as $Fe_2O_3$ | 12.8 | 12.2 | 12.2 | 12.8 | 10.4 | 13.3 | 13.4 |

To insure oxidizing conditions during melting, oxidizing agents such as $HNO_3$, $NH_4NO_3$, or $(NH_4)_2SO_4$ may be added to the batch in minor amounts. Thus, the state of oxidation in molten basalt can be tailored to that determined to be the most desirable through temperature control, air-equilibration processes, and the use of oxidizing agents. Preferably, $Fe_2O_3$ is present in amounts greater than 5% by weight and the ratio $Fe_2O_3$:FeO is greater than 0.6.

The basalt melts were cast into steel molds to form 4" squares having a thickness of ½". These were then placed in an annealer operating at 650° C. and cooled to room temperature. The annealing points of these glasses ranged about 640°–660° C. Electron microscope examination and X-ray diffraction analysis of the squares of basalt glass exhibited no evidence of crystallization therein.

The squares were then placed into an electric furnace and heated in an atmosphere of air at 5° C./minute to a temperature between about 640°–675° C. A temperature within this range was maintained for a sufficient length of time to secure good nucleation, normally about ½–4 hours, after which the temperature in the furnace was again raised at 5° C./minute to a temperature between about 850°–1000° C. for final crystallization. A temperature within the crystallization range was held for a sufficient length of time to insure maximum crystallization, normally about ½–2 hours. Table IV sets out various heat treating schedules which were applied to the squares made from the examples of Table III. In the schedules recorded in Table IV, the crystallized squares were cooled to room temperature by merely cutting off the heat to the furnace and allowing the furnace to cool with the squares retained therein. This rate of cooling was estimated to average about 3° C./minute.

It will be appreciated that modifications in the forming and heat treating steps of this process are available. Hence, the melt need not be cooled to room temperature before being reheated to cause crystallization in situ but may merely be cooled sufficiently rapidly to prevent crystallization to a temperature below the transformation range of the glass, i.e., the temperature at which a liquid melt is deemed to have been transformed into an amorphous solid, this temperature being in the vicinity of the annealing point of the glass, and then reheated to cause crystallization to occur. This practice affords economies in heating.

Further, a nucleation hold within the range 640°–675° C. may be omitted although the final crystallization is generally more uniformly fine-grained and more complete where a nucleation step is utilized. However, if the ration $Fe_2O_3$:$FeO$ is less than 1, then the body will tend to show great deformation during heat treating. Nucleation and crystallization are phenomena dependent upon time and temperature. Hence, while the time within the nucleation range may be as short as ½ hour, much longer times are also useful. As a matter of fact, crystal growth will commence after a long period of time within the nucleation range.

Also, the time for crystallization to become complete is dependent upon the temperature employed and the extent of prior nucleation. Where little nucleation has preceded the crystallization step, the crystals formed are usually somewhat coarser-grained.

Finally, the rate of heating the basalt glass to the nucleation and crystallization ranges and the rate of cooling the crystallized article to room temperature do not constitute critical features of the process. The rate of heating the glass articles is generally dependent upon the thermal shock resistance of the body, as exhibited in the coefficient of thermal expansion thereof, the thickness dimension of the body, and the speed with which crystallization proceeds in situ. It is apparent that a rapid rate of heating would be desirable from a commercial standpoint and the comparatively low thermal expansion coefficients of these basalt glasses (about $59$–$62 \times 10^{-7}$/° C. for Examples 1–7 of Table III) have permitted relatively rapid heating rates to be employed. Nevertheless, as has been explained above, the glass article must be heated above its transformation range in order to initiate nucleation and crystallization. As the glass article is heated above the transformation range, softening of the body can occur which is accompanied by dimensional distortion. The softening point and, hence, the deformation or distortion temperature of the crystallized body are substantially higher than the original glass. Therefore, the rate of temperature rise should be in balance with the rate at which crystallization occurs such that support will be lent to the body to minimize distortion.

Where good dimensional integrity is desired and no physical supporting means such as formers, saggars, and the like, are employed, heating rates in excess of 5° C./minute should not be utilized above the transformation range unless a very long hold within the nucleation range is used. However, where dimensional stability is not important or some kind of physical supporting means is employed, heating rates as high as 20° C./minute have been utilized satisfactorily.

The rate of cooling the crystallized basalt articles to room temperature is dependent upon the coefficient of thermal expansion of the material (about $70$–$85 \times 10^{-7}$/° C. for Examples 1–7 of Table III), and the size of the articles. A cooling rate of 3° C./minute has been found satisfactory under almost all circumstances although much faster rates have been employed with small articles.

Figure 2:
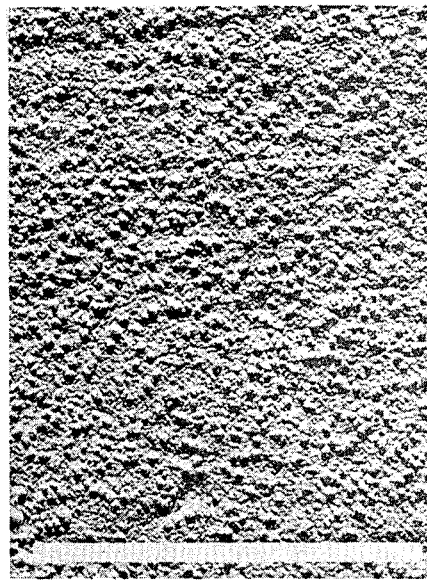

As has been noted above, electron micrographs taken of quenched basalt glass manifest no evidence of crystallization. This is clearly illustrated in the electron micrograph comprising FIG. 1 obtained from the quenched glass of Example 6 of Table III. The bar at the bottom of the micrograph designates 1 micron. However, if these glasses are reheated to about 640° C.–675° C. for about four hours, similar electron micrographs reveal numerous irregular blebs which vary in size from about 100 A. to 500 A. (FIG. 2 depicts the quenched glass of example 6 heated for four hours at 650° C.). These irregularly-shaped blebs, which are believed to represent a liquid-liquid phase separation, become less numerous when the glass is less oxidized and appear to become more widely scattered. From this phenomenon, it is believed that the separating phase must contain a ferric oxide component. Also, the blebs exhibit magnetic behavior, a further indication of an iron oxide concentration therein. It cannot be unequivocally stated that no crystal phases are present in the glass after the four-hour treatment but routine X-ray diffraction analyses have not revealed such.

Figure 3:
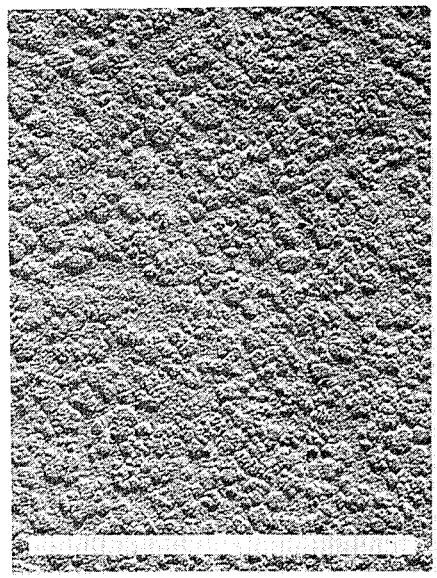

Nevertheless, when the quenched basalt glass is heated to temperatures somewhat above 675° C. and up to about 800° C., the above-described blebs are altered to unmistakeable crystals of magnetite, as is demonstrated through X-ray diffraction analysis and electron microscopy. FIG. 3 is an electron micrograph taken of Example 6 of Table III after the quenched glass had been heated to 700° C. and maintained at that temperature for two hours. These articles exhibited even greater magnetic behavior than those containing the blebs. Electron microscopy coupled with X-ray diffraction analysis has demonstrated the virtual absence of clinopyroxene in these articles with relatively uniformly-sized, randomly-oriented magnetite crystals comprising substantially all of the crystallization. The crystals, themselves, may approach 0.1 micron in size but generally vary between about 100 A.–500 A. The total crystallinity of these articles will normally approximate the weight percentage of iron oxide in the glass, commonly about 10–15% by weight.

In the heat treatment of basalt glass at 850°–1000° C., the crystal phases which predominate in all cases are magnetite and clinopyroxene, the latter being the principal phase. Plagioclase feldspar, a major phase in raw basalt rock, does not crystallize in situ from the quenched basalt glasses. During the heat treatment, magnetite is always the first crystal phase to appear. This phase can be seen to precede the development of pyroxene by means of X-ray diffraction traces taken at intervals during a specific heat treatment. Electron micrographs of these basalt glass-ceramics frequently show that the pyroxene crystals are arranged around nuclei of magnetite, these nuclei often being clumps of small magnetite crystals which can be easily differentiated from the pyroxene by their high etching rate in fused $NaHSO_4$. From this, then, it is believed that the precipitation of magnetite is necessary even in the nucleation and crystallization of fine-grained basalt glass-ceramics. Since magnetite contains ⅔ of its iron in the trivalent or oxidized state, it would appear that an oxidized glass is necessary to cause precipitation of abundant magnetic nuclei. That nucleation is improved by the oxidation of basalt glass, has been demonstrated in the coarse crystallization developed in situ where the basalt has been melted under reducing conditions, e.g., by adding sugar, starch, SiC, or other reducing agent to the basalt melt. At bottom, then, this invention is based upon the prouduction of a basalt glass wherein most of the iron is present in the oxidized state. Such a glass can be heat treated to initiate the formation of nuclei containing a ferric oxide component which act as sites for the growth of crystals thereon. By these various techniques for producing oxidized basalt, the final product should have a ratio of $Fe_2O_3$ to $FeO$ greater than 0.6 and the total amount of $Fe_2O_3$ alone should exceed 5% by weight.

When oxidized basalt glasses are heat treated in a reducing atmosphere, there is a tendency for the clinopyroxene in the surface layers of the article to become coarse-grained. Therefore, the heat treating process is preferably undertaken in a non-reducing atmosphere, i.e., a neutral or, more preferably, an oxidizing atmosphere.

These basalt melts are quite fluid and a fining agent is usually not needed. However, a very minor amount of a fining agent such as $As_2O_5$, which is also an oxidizing agent, may be employed.

Table IV also records the crystal phases present in the crystallized article, the coefficient of thermal expansion between 0°–300° C. ($\times 10^{-7}/°$ C.), and the modulus of rupture (p.s.i.). The modulus of rupture measurements were obtained in the conventional manner by using rods which had been abraded with 30 grit silicon carbide. The coefficient of thermal expansion was also measured by the conventional method.

TABLE IV

| Example No. | Heat treating, ° C. | Crystal phases | Example coefficient | Modulus of rupture |
|---|---|---|---|---|
| 1 | 4 hours at 650 / 1 hour at 900 | Clinopyroxene / Magnetite | 72.4 | 13,500 |
| 2 | 4 hours at 650 / 1 hour at 900 | Clinopyroxene / Magnetite | 80.4 | 10,000 |
| 3 | 4 hours at 650 / 1 hour at 900 | Clinopyroxene / Magnetite | 85.2 | 10,000 |
| 4 | 4 hours at 650 / 1 hour at 900 | Clinopyroxene / Magnetite | 73.4 | 10,000 |
| 5 | 4 hours at 650 / 1 hour at 900 | Clinopyroxene / Magnetite | 73.2 | 12,000 |
| 6 | 4 hours at 650 / 1 hour at 900 | Clinopyroxene / Magnetite | 73.0 | 10,000 |
| 7 | 4 hours at 650 / 1 hour at 900 | Clinopyroxene / Magnetite | 72.3 | 12,000 |

The desirability of melting the basalt under oxidizing conditions such that the total amount of $Fe_2O_3$ present is at least 5% by weight and the ratio of $Fe_2O_3:FeO$ is greater than 0.6 is clearly demonstrated in Table V wherein analyses of the iron contents of several glass-ceramic samples of Example 6 which had been melted under various conditions are reported. Each sample was melted for four hours at 1400° C., poured into steel molds to form 4″ x 4″ x ½″ squares, and then annealed at 600° C. The squares were thereafter heated in an air atmosphere to 650° C., held thereat for four hours, the temperature raised to 880° C. maintained thereat for one hour, and then the squares were cooled to room temperature. Example 6a was melted in an electric furnace utilizing an atmosphere of air. Examples 6b and 6c were melted in the same furnace as Example 6a with an air atmosphere but 2% $NH_4NO_3$ and 4% $NH_4NO_3$, respectively, were added thereto as oxidizing agents. Example 6d was melted in a similar fashion to Examples 6a–c but 2% sugar was added thereto as a reducing agent.

A comparison of the amount of deformation occurring during heat treatment and the size of the crystals grown in situ through the heat treatment illustrates the improvement in the glass-ceramic product resulting from highly oxidizing conditions during melting. Although a chemical analysis of Example 6d was not undertaken, the high deformation, the surface crystallization, and the presence of coarse aggregates in the interior of the square militate against its being considered as a true glass-ceramic product.

TABLE V

| Example No. | Total Fe as $Fe_2O_3$ | FeO analyzed | $Fe_2O_3$ analyzed | Deformation | Grain size |
|---|---|---|---|---|---|
| 6a | 13.3 | 7.7 | 4.8 | Some deformation | 1 micron. |
| 6b | 14.9 | 7.9 | 6.2 | Slight deformation | 1/5 micron. |
| 6c | 15.8 | 4.8 | 10.0 | Very slight deformation | 1/10 micron. |
| 6d | | | | High deformation extrusion, and surface crystallization. | Coarse-grained aggregates. |

Experience has demonstrated that the optimum heat treating schedule for oxidized basalt glasses from the standpoints of minimum distortion of the body and minimum overall time contemplates a nucleation hold of at least about ½–1 hour at 650° C. followed by a crystallization hold at 900° C. of about ½–1 hour.

Figure 4:
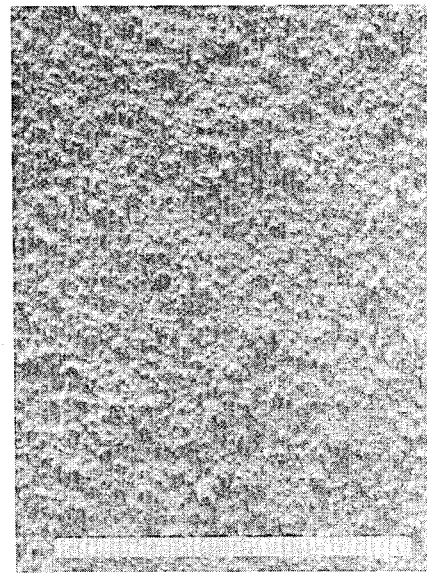

The glass-ceramic article heat treated at 850°–1000° C. is in excess of 30% by weight crystalline, generally more than 50% and sometimes greater than 75% by weight crystalline. The crystals are essentially all more finely-grained than 1 micron in diameter and the majority are less than 0.5 micron in diameter. FIG. 4 is an electron micrograph of Example 6 heat treated in accordance with Table IV. The chemical durability of the article is very good since the residual glassy matrix is rich in silica. The residual glass is necessarily rich in plagioclase components since this phase does not crystallize in situ. However, since relatively more of the $Na_2O$, $CaO$, and $Al_2O_3$ of the plagioclase composition are taken in by the clinopyroxene than is silica, the residual glass is much richer in $SiO_2$ than the original feldspar. Such highly siliceous $CaO-Na_2O-Al_2O_3-SiO_2$ glasses exhibit good chemical durability.

One of the major material advantages of basalt crystallized according to the technique of the instant invention, i.e., the controlled crystallization in situ of oxidized basalt glasses through heat treatment, is excellent chemical durability. Resistance to both mineral acids and alkali carbonate solution is much superior to that of basalt glass (reduced or oxidized) and basalt crystallized through heat treatment of reduced basalt glass. Thus, the weight loss of the crystalline products of this invention in the conventional durability tests utilizing hydrochloric acid and sodium carbonate solutions is frequently only about one-third that of the basalt glass or basalt crystallized through the heat treatment of reduced basalt glasses.

An explanation for the superior chemical durability of the high temperature, fine grained, oxidized basalt glass ceramics is believed to be that the fine-grained product is composed largely of a Ca-Mg silicate (clinopyroxene) and Fe₃O₄ (magnetite) dispersed in a matrix of aluminosilicate glass of basically a plagioclase feldspar composition (CaAl₂Si₂O₈-NaAlSi₃O₈). The alumino silicate glass is of superior chemical durability to the crystalline glasses and, since it forms a continuous phase, it gives the composite material effective protection from chemical attack. Such a protective continuous phase does not occur in crystallized basalt formed by the fusion cast process or in natural basalt because in this material the plagioclase feldspar is present as discrete crystals rather than in a continuous glassy form.

In addition, it is believed that the composition of the residual glassy phase is even richer in Al₂O₃ and SiO₂ than the plagioclase feldspar composition in the case of highly oxidized basalt glass-ceramics. It is well known that the chemical components Na₂O and Fe₂O₃ combine with SiO₂ to form the pyroxene, acmite (NaFeSi₂O₆). Thus, Na₂O, which would normally enter the plagioclase phase (albite—NaAlSi₃O₈) in the natural rock and the glass in the reduced glass-ceramic body, will, instead, enter the crystalline pyroxene as the acmite component. The resulting decrease in the alkali content of the continuous glassy phase adds to its acid durability and accounts for the improved acid durability of the oxidized glass-ceramic bodies over that of the more reduced materials. The following equation is believed to summarize this hypothesis:

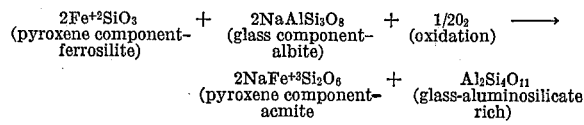

When basalt glass-ceramics are heated much above the top heat treating temperature, say 1050° C., large spherulites of plagioclase form. These radial plagioclase crystals seem to grow independently of the pre-existing minute pyroxene crystals. The temperature required to grow these spherulites is apparently above the solidus temperature for the basalt, i.e., above the temperature at which a liquid exists in equilibrium with crystals. These spherulites are frequently larger than 1 mm. in diameter and are scattered haphazardly through the body. They apparently do not grow easily on previous crystalline centers whether they be magnetite or pyroxene.

Basalt glass-ceramics are thermally stable at temperatures up to about 1000° C. The knoop hardness of ground and polished basalt glass-ceramics is higher than that for basaltic glasses, frequently measuring 900. This figure is much higher than any measured on commercially available glass-ceramic materials. Hence, it is apparent that basalt glass-ceramics exhibit extreme abrasion resistance.

From Table IV it can be seen that the mechanical strength of basalt glass-ceramics, as indicated by modulus of rupture measurements, is often twofold that of conventional annealed glasses.

We have discovered that basalt glass articles which have been subjected to the low temperature heat treatment only, viz, about 675–800° C., such that magnetite comprises essentially the only crystal phase developed, exhibit useful properties in themselves. They are slightly stronger than annealed basalt glass (modulus of rupture of about 8000–9000 p.s.i.), demonstrate a chemical durability at least as good as basalt glass, but, more importantly, they can be readily sawed, drilled, and break with a ceramic-type fracture rather than a glassy fracture. These features have recommended their use in underground sewer and water piping. The fact that the crystallization is undertaken at a low temperature is also advantageous from the view of commercial production. Finally, as was explained above with respect to the high temperature heat treatment of basalt glass articles, extended treatment times can be carried out with no harm to the article produced, but we prefer periods ranging between about 0.5–4 hours to attain substantial crystallization. Also, it may be advantageous to employ a nucleating step at 640°–675° C. prior to crystallizing at 675°–800° C.

We claim:

1. A method for making a glass-ceramic article consisting essentially of relatively uniformly-sized, randomly-oriented crystals of clinopyroxene and magnetite homogeneously dispersed in a glassy matrix, wherein said crystals exhibit an essentially spherulite-free structure, are substantially all smaller than 1 micron in diameter, and constitute at least 30% by weight of the article, which comprises the steps of:

(a) melting to a homogeneous melt at about 1350°–1600° C. a composition consisting essentially of basalt containing at least 5% by weight Fe₂O₃ and having a Fe₂O₃:FeO ratio, by weight, greater than 0.6 wherein oxidizing materials are introduced into the melt to produce sufficiently oxidizing conditions to secure at least part of the iron in the melt in the oxidized state;

(b) simultaneously cooling said melt below the transformation range thereof and forming a glass shape therefrom, said glass being essentially free from crystallization;

(c) heating said glass shape in a non-reducing atmosphere to a temperature between about 850°–1000° C.;

(d) maintaining said shape within that temperature range for a period of time sufficient to attain essentially spherulite-free crystallization of clinopyroxene and magnetite; and then (e) cooling the crystallized article to room temperature.

2. A method according to claim 1 wherein prior to heating the glass shape to between about 850°–1000° C. it is heated to a temperature between about 640°–675° C. and maintained thereat for a period of time sufficient to secure substantial nucleation.

3. A method according to claim 2 wherein the time sufficient to secure substantial nucleation is about 0.5–4 hours and the time sufficient to attain the desired crystallization is about 0.5–2 hours.

4. A method according to claim 1 wherein said basalt is a tholeitic basalt.

5. A method for making a glass-ceramic article consisting essentially of relatively uniformly-sized, randomly-oriented crystals of magnetite homogeneously dispersed in a glassy matrix, wherein said crystals exhibit an essentially spherulite-free structure and are substantially all smaller than 0.1 micron in diameter which comprises the steps of:

(a) melting to a homogeneous melt at about 1350°–1600° C. a composition consisting essentially of basalt containing at least 5% by weight Fe₂O₃ and having a Fe₂O₃:FeO ratio, by weight, greater than 0.6 wherein oxidizing materials are introduced into the melt to produce sufficiently oxidizing conditions to secure at least part of the iron in the malt in the oxidized state;

(b) simultaneously cooling said melt below the transformation range thereof and forming a glass shape therefrom, said glass being essentially free from crystallization;

(c) heating said glass shape in a non-reducing atmosphere to a temperature between about 675°–800° C.;

(d) maintaining said shape within that temperature range for a period of time sufficient to attain essentially spherulite-free crystallization of magnetite; and then (e) cooling the crystallized article to room temperature.

6. A method according to claim 5 wherein prior to heating the glass shape to between about 675°–800° C. it is heated to a temperature between about 640°–675° C. and maintained thereat for a period of time sufficient to secure substantial nucleation.

7. A method according to claim 6 wherein the time sufficient to secure substantial nucleation is about 0.5–4 hours and the time sufficient to attain the desired crystallization is about 0.5–4 hours.

8. A method according to claim 5 wherein said basalt is a tholeiitic basalt.

9. A glass-ceramic article made according to the method of claim 1.

10. A glass-ceramic article made according to the method of claim 5.

References Cited

UNITED STATES PATENTS

| | | | |
|---|---|---|---|
| 2,920,971 | 1/1960 | Stookey | 65—33 |
| 2,932,922 | 4/1960 | Mauritz | 65—33 |
| 3,146,114 | 8/1964 | Kivlighn | 65—33X |
| 3,313,609 | 4/1967 | Megles | 65—33 |
| 3,352,656 | 11/1967 | McMillan | 65—33 |
| 3,352,698 | 11/1967 | McMillan | 65—33X |

OTHER REFERENCES

Voldan, J.: "The Melting and Crystallization of Basic Eruptive Rocks," Advances in Glass Technology, The American Ceramic Society, Plenum Press, New York, 1962, pp. 382–95.

S. LEON BASHORE, Primary Examiner

J. H. HARMAN, Assistant Examiner

U.S. Cl. X.R.

106—39, 60; 161—1